US012761603B2

(12) United States Patent
Park et al.

(10) Patent No.: US 12,761,603 B2
(45) Date of Patent: Oct. 13, 2026

(54) METHOD AND APPARATUS FOR COMPRESSING HOLOGRAM

(71) Applicant: ELECTRONICS AND TELECOMMUNICATIONS RESEARCH INSTITUTE, Daejeon (KR)

(72) Inventors: Min Sik Park, Sejong-si (KR); Joong Ki Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 264 days.

(21) Appl. No.: 18/638,918

(22) Filed: Apr. 18, 2024

(65) Prior Publication Data

US 2024/0353796 A1 Oct. 24, 2024

(30) Foreign Application Priority Data

Apr. 18, 2023 (KR) ........................ 10-2023-0050835

(51) Int. Cl.
*G03H 1/16* (2006.01)
*G03H 1/08* (2006.01)
(Continued)

(52) U.S. Cl.
CPC ............. *G03H 1/16* (2013.01); *G03H 1/0808* (2013.01); *H04N 19/61* (2014.11); *H04N 19/70* (2014.11); *G03H 2225/32* (2013.01)

(58) Field of Classification Search
CPC ...... G03H 1/0808; G03H 1/16; G03H 1/0841; G03H 2225/32; H04N 19/61; H04N 19/70
(Continued)

(56) References Cited

U.S. PATENT DOCUMENTS

| | | | | |
|---|---|---|---|---|
| 4,905,081 | A | 2/1990 | Morton | |
| 9,861,277 | B2 * | 1/2018 | Anderson | A61B 3/1015 |

(Continued)

FOREIGN PATENT DOCUMENTS

| | | | |
|---|---|---|---|
| KR | 10-2014-0021568 | A | 2/2014 |
| KR | 10-2018-0017659 | A | 2/2018 |

(Continued)

OTHER PUBLICATIONS

Peixeiro JP, Brites C, Ascenso J, Pereira F. Holographic data coding: Benchmarking and extending hevc with adapted transforms. IEEE Transactions on Multimedia. Aug. 21, 2017;20(2):282-97.*

(Continued)

*Primary Examiner* — Phu K Nguyen
(74) *Attorney, Agent, or Firm* — LRK PATENT LAW FIRM

(57) ABSTRACT

A method and apparatus for compressing hologram is disclosed. The apparatus includes memory to store one or more instructions, and one or more processors to execute the one or more instructions in the memory, wherein the one or more processors perform generating phase wavefront blocks using a frame of a phase-only hologram, generating a first prediction wavefront block using one of the phase wavefront blocks, generating a differential wavefront block using a phase wavefront block and the first prediction wavefront block, transforming and quantizing the differential wavefront block, generating a restored differential wavefront block by inversely quantizing and inversely transforming the differential wavefront block transformed and quantized, generating a restored phase wavefront block using the restored differential wavefront block, generating a restored phase wavefront using restored phase wavefront blocks generated using the restored differential wavefront blocks,
(Continued)

and restoring the phase-only hologram using the restored phase wavefront.

18 Claims, 6 Drawing Sheets

(51) Int. Cl.
*H04N 19/61* (2014.01)
*H04N 19/70* (2014.01)

(58) Field of Classification Search
USPC .......................................................... 345/418
See application file for complete search history.

(56) References Cited

U.S. PATENT DOCUMENTS

| | | | | |
|---|---|---|---|---|
| 10,996,626 | B2 | 5/2021 | Park | |
| 11,532,122 | B2 | 12/2022 | Yoon et al. | |
| 2009/0213443 | A1 | 8/2009 | Kang et al. | |
| 2016/0301915 | A1* | 10/2016 | Shechtman | G02B 26/06 |
| 2017/0315507 | A1 | 11/2017 | Collings et al. | |
| 2022/0272380 | A1* | 8/2022 | Gioia | H04N 19/20 |
| 2023/0168627 | A1* | 6/2023 | Seo | G03H 1/0808 359/9 |
| 2023/0305489 | A1* | 9/2023 | Jang | G06T 9/002 |
| 2024/0036308 | A1* | 2/2024 | Christmas | G02B 27/0081 |
| 2024/0045376 | A1* | 2/2024 | El Rhammad | G03H 1/0808 |
| 2025/0029282 | A1* | 1/2025 | Hong | H04N 21/85406 |
| 2025/0193442 | A1* | 6/2025 | Hong | H04N 19/597 |

FOREIGN PATENT DOCUMENTS

| | | | |
|---|---|---|---|
| KR | 10-1899026 | B1 | 10/2018 |
| KR | 10-2023-0011162 | A | 1/2023 |

OTHER PUBLICATIONS

Chen A, Gui J, Ma X, Liu J, Jiang Z, Song Q. Compression of color digital hologram using wavelet thresholds and two-times quantization. Optics Communications. Jun. 15, 2023;537:129439.*

Birnbaum T, Ahar A, Blinder D, Schretter C, Kozacki T, Schelkens P. Wave atoms for digital hologram compression. Applied optics. Aug. 1, 2019;58(22):6193-203.*

Schelkens P, Ahar A, Gilles A, Muhamad RK, Naughton TJ, Perra C, Pinheiro A, Stępień P, Kujawińska M. Compression strategies for digital holograms in biomedical and multimedia applications. Light: advanced manufacturing. Dec. 12, 2022;3(3):601-21.*

Kim JK, Oh KJ, Kim JW, Kim DW, Seo YH. Intra prediction-based hologram phase component coding using modified phase unwrapping. Applied Sciences. Mar. 3, 2021;11(5):2194.*

Jang C, Bang K, Li G, Lee B. Holographic near-eye display with expanded eye-box. ACM Transactions on Graphics (TOG). Dec. 4, 2018;37(6):1-4.*

Y.-H. Seo, H.-J. Choi, and D.-W. Kim, 'Digital Hologram Coding', Holography—Basic Principles and Contemporary Applications. InTech, May 29, 2013. doi: 10.5772/53904.*

Huang Z, Cao L. Quantitative phase imaging based on holography: trends and new perspectives. Light: Science & Applications. Jun. 27, 2024;13(1):145.*

Tobias Birnbaum et al., "Wave atoms for digital hologram compression", vol. 58, No. 22 / Aug. 1, 2019 / Applied Optics.

David Blinder et al., "Accelerated computer generated holography using sparse bases in the STFT domain", vol. 26, No. 2 | Jan. 22, 2018 | Optics Express.

* cited by examiner

METHOD AND APPARATUS FOR COMPRESSING HOLOGRAM

CROSS-REFERENCE TO RELATED APPLICATION

The present application claims priority to Korean Patent Application No. 10-2023-0050835, filed on Apr. 18, 2023, the entire contents of which are incorporated herein by reference.

BACKGROUND

1. Technical Field

The present disclosure relates to a method and apparatus for compressing a hologram, more particularly, to a method and apparatus for compressing a wavefront-based phase-only hologram.

2. Description of Related Art

The statements in this section merely provide background information related to the present disclosure and do not necessarily constitute prior art.

Two-dimensional photographs and videos only contain information about light intensity and color. In contrast, a hologram refers to a photograph or video that contains phase information in addition to information about light intensity and color.

Since a hologram additionally contains information about optical phase, its data size is bigger than those of two-dimensional photographs and videos. To efficiently send and receive hologram data by using a limited transmission bandwidth, research has been conducted concerning compression methods capable of reducing hologram data size without making a difference in image quality.

Conventional methods for compressing still images include lossless compression and lossy compression. Lossless compression is a method of compressing repeated data through statistical analysis according to how frequently it is repeated. Lossy compression is a method in which data is preserved if humans can notice even minor changes to the data and data that is less noticeable to human perception is discarded, to accord with a human's three-dimensional perceptual characteristics.

A two-dimensional video is compressed by combining prediction encoding and two-dimensional still image compression. Prediction encoding is a compression method using temporal and spatial correlations between frames.

A method of compressing hologram data includes the short-time Fourier transform. The short-term Fourier transform provides better compression performance than the Fourier transform or the wavelet transform. However, the Fourier transform or the wavelet transform are only applicable to hologram still images.

Hologram video data has lower temporal and spatial correlations between frames than two-dimensional videos. Thus, the conventional prediction encoding method cannot be used. Instead of the conventional prediction encoding method, a prediction encoding method appropriate for hologram video data compression is required.

SUMMARY

A primary aspect of the present disclosure is to provide a wavefront-based prediction encoding method appropriate for efficiently compressing hologram video data, in order to efficiently send and receive the hologram video data.

The aspects of the present disclosure are not limited to the foregoing, and other aspects not mentioned herein will be able to be clearly understood by those skilled in the art from the following description.

According to an aspect of the present disclosure, an apparatus for compressing a hologram is provided, an apparatus for compressing a hologram, the apparatus comprising a memory configured to store one or more instructions, and one or more processors configured to execute the one or more instructions stored in the memory, wherein the one or more processors, by executing the one or more instructions, perform steps comprising, generating a plurality of phase wavefront blocks by using a certain frame of a phase-only hologram, generating a first prediction wavefront block by using one of the plurality of phase wavefront blocks, generating a differential wavefront block by using a phase wavefront block and the first prediction wavefront block, transforming and quantizing the differential wavefront block, generating a restored differential wavefront block by inversely quantizing and inversely transforming the differential wavefront block which is transformed and quantized, generating a restored phase wavefront block by using the restored differential wavefront block, generating a restored phase wavefront by using a plurality of restored phase wavefront blocks which are generated by using the restored differential wavefront blocks, and restoring the phase-only hologram by using the restored phase wavefront.

According to another aspect of the present disclosure, a method for compressing and restoring a hologram, the method comprising, generating a plurality of phase wavefront blocks by using a certain frame of a phase-only hologram, generating a first prediction wavefront block by using one of the plurality of phase wavefront blocks, generating a differential wavefront block by using a phase wavefront block and the first prediction wavefront block, transforming and quantizing the differential wavefront block, generating a restored differential wavefront block by inversely quantizing and inversely transforming the differential wavefront block which is transformed and quantized, generating a restored phase wavefront block by using the restored differential wavefront block, generating a restored phase wavefront by combining a plurality of restored phase wavefront blocks which are generated by using the restored differential wavefront blocks, and restoring the phase-only hologram from the restored phase wavefront.

According to embodiments of the present disclosure, it is possible to efficiently compress hologram video data by using a wavefront-based prediction encoding method and to effectively send and receive the hologram video data.

The effects of the present disclosure are not limited to the foregoing, and other effects not mentioned herein will be able to be clearly understood by those skilled in the art from the following description.

DETAILED DESCRIPTION

Figure 1:
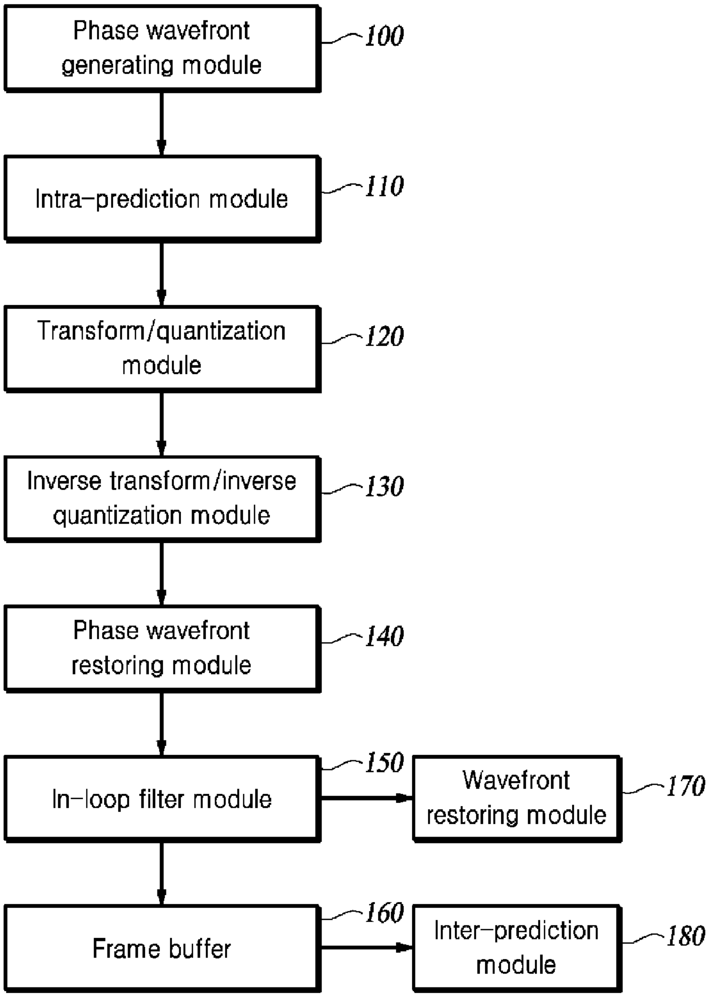
FIG. 1 depicts a schematic block diagram of a hologram compressing apparatus according to an embodiment of the present disclosure.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

The following detailed description, together with the accompanying drawings, is intended to describe exemplary embodiments of the present disclosure and is not intended to represent the only embodiments in which the present disclosure may be practiced.

To compress hologram data, a complex hologram which is represented by complex data or hologram fringe pattern data is mainly used. Meanwhile, a holographic display for presenting a hologram supports phase-only modulation. For a phase modulation-type holographic display, phase-only hologram data is used. A method of compressing a phase-only hologram which is generated by converting a complex hologram for use in a holographic display will be described below.

FIG. 1 depicts a schematic block diagram of a hologram compressing apparatus according to an embodiment of the present disclosure.

Referring to FIG. 1, the hologram compressing apparatus may include all or some of a phase wavefront generating module 100, an intra-prediction module 110, a transform/quantization module 120, an inverse transform/inverse quantization module 130, a phase wavefront restoring module 140, an in-loop filter module 150, a frame buffer 160, a wavefront restoring module 170, an inter-prediction module 180, an entropy encoder 400.

The phase wavefront generating module 100 converts a certain frame of a phase-only hologram video to generate a phase wavefront. The phase wavefront refers to a wavefront that is generated by converting a phase-only hologram of a frame. A phase wavefront may be generated from a phase-only hologram by using a phase unwrapping max-flow/min-cut technique or a discrete cosine transform (DCT)-based phase unwrapping technique.

The phase wavefront can be expressed by Zernike polynomials. The Zernike polynomials are given by Equation 1:

$$Z_n^{*m}(\rho, \theta) = \begin{Bmatrix} R_n^{|m|}(\rho)\times\varphi(\theta) & \text{for } m \geq 0,\ 0 \leq \rho \leq 1,\ 0 \leq \theta \leq 2\pi \\ -R_n^{|m|}(\rho)\times\varphi(\theta) & \text{for } m \geq 0,\ 0 \leq \rho \leq 1,\ 0 \leq \theta \leq 2\pi \end{Bmatrix} \quad \text{[Equation 1]}$$

The phase wavefront generating module 100 finds a plurality of Zernike coefficients from the generated phase wavefront. The Zernike coefficients can be found by using Equation 2:

$$W_n^m = \frac{1}{\pi}\int_0^1\int_0^{2\pi} W(\rho, \theta)\cdot Z_n^m(\rho, \theta)d\theta\rho d\rho \quad \text{[Equation 2]}$$

where W is the Zernike coefficient, and $W(\rho,\theta)$ is the phase wavefront.

The phase wavefront generating module 100 may generate a plurality of phase wavefront blocks. The phase wavefront blocks are blocks into which the phase wavefront is divided for parallel processing. A plurality of phase wavefront blocks are generated from a single phase wavefront.

Figure 2:
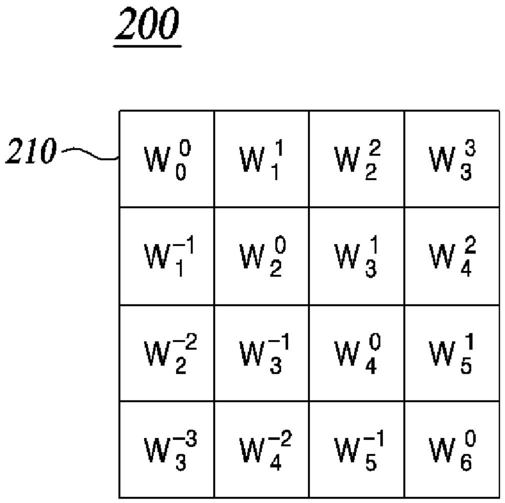
FIG. 2 is a view illustrating a Zernike coefficient block according to an embodiment of the present disclosure.

FIG. 2 is a view illustrating a Zernike coefficient block 200 according to an embodiment of the present disclosure.

Referring to FIG. 2, the phase wavefront generating module 100 may generate a Zernike coefficient block 200 by using a plurality of Zernike coefficients 210. Each Zernike coefficient block 200 may have a resolution of (2, 2), (4, 4), or (8, 8).

The resolution of the Zernike coefficient block in FIG. 2 is (4, 4). The Zernike coefficient block 200 includes a plurality of Zernike coefficients 210. The number of Zernike coefficients 210 included in the Zernike coefficient block 200 differs depending on the resolution of the Zernike coefficient block 200. For example, a Zernike coefficient block 200 with a resolution of (2, 2) includes four Zernike coefficients 210. The Zernike coefficient block 200 with a resolution of (4, 4) includes sixteen Zernike coefficients 210.

The intra-prediction module 110 generates a first prediction wavefront block by using a phase wavefront block generated by the phase wavefront generating module 100 and a Zernike coefficient block 200 generated by the phase wavefront generating module 100.

The first prediction wavefront block can be calculated by Equation 3:

$$\underline{WB}_{ij} = \sum_{n=0}^{N}\sum_{m=-n}^{n} ZB_{ij}\{W_n^m Z_n^m(\rho, \theta)\} \quad \text{[Equation 3]}$$

where $\overline{WB}_{ij}$ denotes the first prediction wavefront block, and $\overline{ZB}_{ij}$ denotes the Zernike coefficient block 200.

Figure 3:
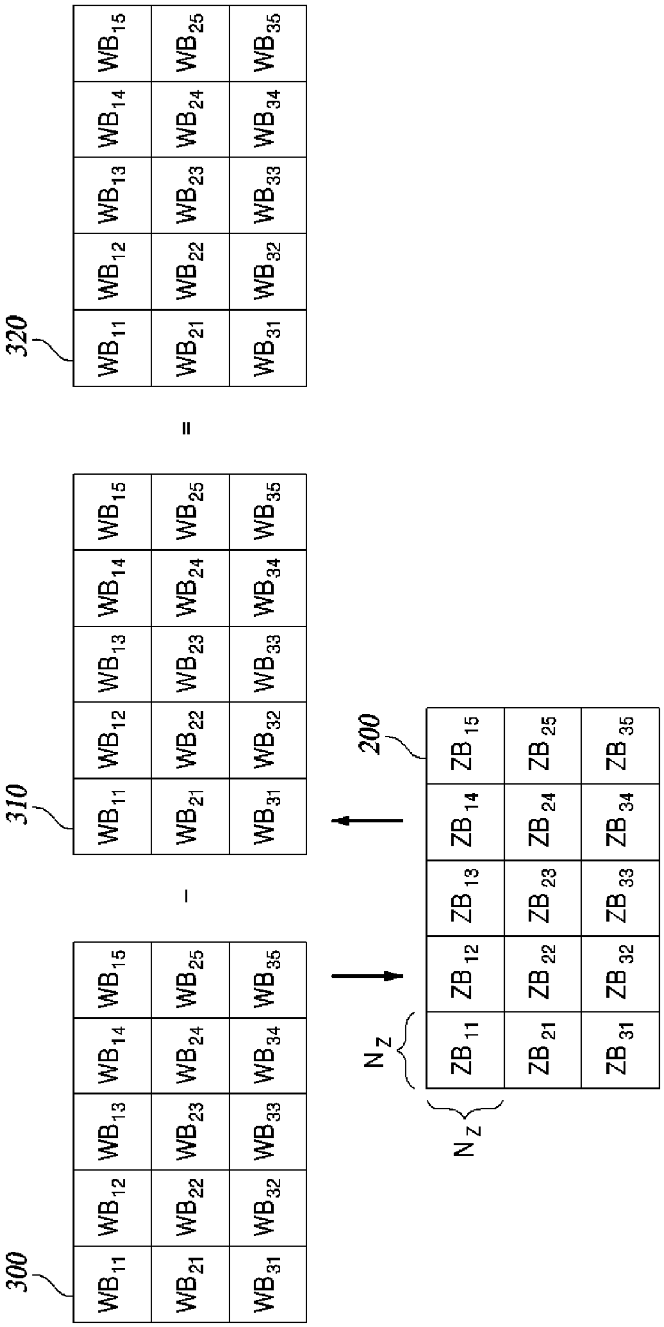
FIG. 3 is a view illustrating a method of generating a differential wavefront block according to an embodiment of the present disclosure.

FIG. 3 is a view illustrating a method of generating a differential wavefront block 320 according to an embodiment of the present disclosure.

Referring to FIG. 3, a single phase wavefront includes a plurality of phase wavefront blocks 300. The phase wavefront blocks 300 are blocks into which the phase wavefront is divided according to the position of the frame. The intra-prediction module 110 may generate a first prediction wavefront block 310 by using a phase wavefront block 300 and a Zernike coefficient block 200. Here, when there are fifteen phase wavefront blocks 300 included in the phase wavefront, fifteen Zernike coefficient blocks 200 and fifteen first prediction wavefront blocks 310 are generated.

The intra-prediction module 110 generates a plurality of differential wavefront blocks 320. Here, the differential wavefront block 320 is the difference between the phase wavefront block 300 and the first prediction wavefront block 310 or the difference between the phase wavefront block 300 and a second prediction wavefront block. The differential wavefront block 320 can be calculated by using Equation 4:

$$DB_{ij} = WB_{ij} - \underline{WB}_{ij} \quad \text{[Equation 4]}$$

where $DB_{ij}$ is the differential wavefront block, $WB_{ij}$ is the phase wavefront block 300, and $\underline{WB}_{ij}$ if is the first prediction wavefront block 310 or the second prediction wavefront block. Here, when there are fifteen phase wavefront blocks 300 and fifteen first prediction wavefront blocks 310, fifteen differential wavefront blocks 320 are generated.

A single first prediction wavefront block and a single differential wavefront block are generated from a single phase wavefront block. The hologram compressing apparatus may generate a plurality of first prediction wavefront blocks and a plurality of differential wavefront blocks from a plurality of phase wavefront blocks, by repeating the process of generating a first prediction wavefront block and a differential wavefront block with respect to a phase wavefront block.

The transform/quantization module 120 is a module for transforming and quantizing a differential wavefront block 320. For example, the transform/quantization module 120 may transform a differential wavefront block 320 by using the discrete cosine transform (DCT). The transform/quantization module 120 quantizes a DCT coefficient resulting from DCT transformation of the differential wavefront block 320.

The inverse transform/inverse quantization module 130 inversely quantizes the DCT coefficient quantized by the transform/quantization module 120. For example, the inverse transform/inverse quantization module 130 may restore the differential wavefront block by inversely transforming the inversely quantized DCT coefficient. Here, the differential wavefront block thus restored is referred to as a restored differential wavefront block.

The phase wavefront restoring module 140 restores the phase wavefront block by combining the differential wavefront block restored by the inverse transform/inverse quantization module 130 with the first prediction wavefront block 310 or the second prediction wavefront block. The phase wavefront block thus restored is referred to as a restored phase wavefront block.

The in-loop filter module 150 combines a plurality of restored phase wavefront blocks restored by the phase wavefront restoring module 140. The in-loop filter module 150 restores one phase wavefront through the process of removing fringes between the combined restored phase wavefront blocks. The phase wavefront thus restored is referred to as a restored phase wavefront.

The frame buffer 160 stores the phase wavefront restored by the in-loop filter module 150. The frame buffer 160 may store a plurality of restored phase wavefronts.

The wavefront restoring module 170 restores one frame of a phase-only hologram from a restored phase wavefront by using a phase wrapping technique. The wavefront restoring module 170 may use a phase wrapping technique in which the phase period is $2\pi$.

The wavefront restoring module 170 may generate a phase-only hologram video by combining restored frames of a phase-only hologram.

The inter-prediction module 180 predicts the motion of a phase wavefront block corresponding to a current frame from the plurality of restored phase wavefronts stored in the frame buffer 160, and generates a second prediction wavefront block by using the predicted motion. The inter-prediction module 180 may generate a motion vector by using the predicted motion of the phase wavefront block.

Figure 4:
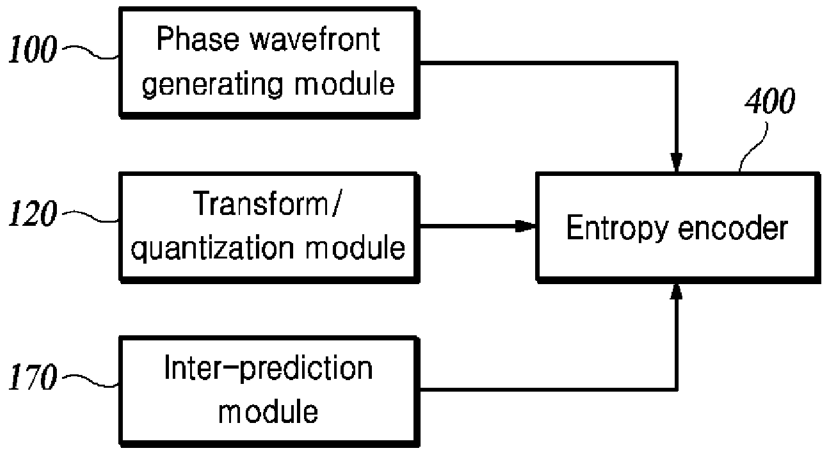
FIG. 4 is a block diagram showing a schematic construction of an entropy encoder according to an embodiment of the present disclosure.

FIG. 4 is a block diagram showing a schematic construction of the entropy encoder 400 according to an embodiment of the present disclosure.

A phase-only hologram may be generated from coherent light or a computer-generated hologram (CGH).

When a phase-only hologram is generated from coherent light, random speckle noise is generated even with a minor phase difference. A phase wavefront block 300 generated from coherent light contains random speckle noise. A wavefront expressed by Zernike polynomials is characterized by its continuous and smooth surface. A first prediction wavefront block 310 generated from the phase wavefront block 300 by using Zernike polynomials does not contain random speckle noise.

When a phase-only hologram is generated from a CGH, the phase wavefront block 300 contains random phase noise by which the diffuseness of an objective surface is represented. Since Zernike polynomials have a continuous and smooth wavefront, the first prediction wavefront block 310 does not contain random speckle noise.

Because the differential wavefront block 320 is the difference between the phase wavefront block 300 and the first prediction wavefront block 310 or the difference between the phase wavefront block 300 and the second prediction wavefront block, it contains random speckle noise or random phase noise. Since the differential wavefront block 320 contains objective surface information as a form of random speckle noise or random phase noise, it is necessary that the prediction wavefront block and the differential wavefront block 320 are compressed together.

Referring to FIG. 4, the entropy encoder 400 generates losslessly compressed data by losslessly compressing all or some of the plurality of Zernike coefficients 210 generated by the phase wavefront generating module 100, the differential wavefront block transformed/quantized by the transform/quantization module 120, and the motion vector generated by the inter-prediction module 180. Since the losslessly compressed data generated by the entropy encoder 400 contains Zernike coefficients 210 for generating the first prediction wavefront block 310, the motion vector for generating the second prediction wavefront block, and the transformed/quantized phase wavefront block, it contains information on the prediction wavefront blocks and objective surface information as well.

The entropy encoder 400 may send the losslessly compressed data to another hologram decoder as a form of bitstream by using wired communication or wireless communication.

Figure 5:
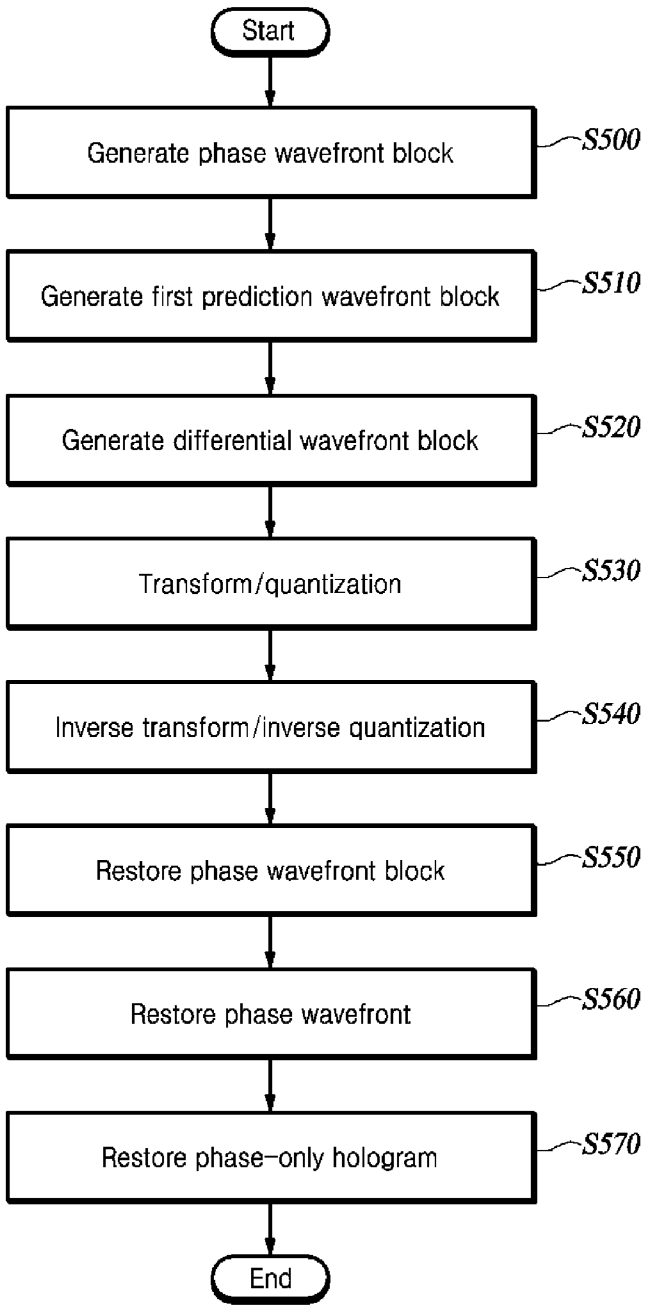
FIG. 5 is a sequential chart showing a method for compressing a phase-only hologram according to an embodiment of the present disclosure.

FIG. 5 is a sequential chart showing a method for compressing a phase-only hologram according to an embodiment of the present disclosure.

Referring to FIG. 5, the phase wavefront generating module 100 may generate a phase wavefront and a phase wavefront block 300 from one frame of a phase-only hologram by using a phase wrapping technique (S500). The phase wavefront generating module 100 generates a Zernike coefficient block 200. Here, the number of phase wavefront blocks 300 and the number of Zernike coefficient blocks 200 are equal.

The intra-prediction module 110 generates a first prediction wavefront block 310 by using the phase wavefront block 300 and the Zernike coefficient block 200 (S510). Here, the number of first prediction wavefront blocks 310 is equal to the number of phase wavefront blocks 300 and the number of Zerniket coefficient blocks 200.

The intra-prediction module 110 generates a differential wavefront block 320 by using the phase wavefront block 300, the first prediction wavefront block 310, and a second prediction wavefront block (S520). Here, the number of differential wavefront blocks 320 is equal to the number of phase wavefront blocks 300.

The transform/quantization module 120 transforms the differential wavefront block 320 generated by the intra-prediction module 110 by using the DCT. The transform/quantization module 120 quantizes a DCT coefficient resulting from DCT transformation of the differential wavefront block 320 (S530).

The inverse transform/inverse quantization module 130 inversely quantizes the quantized DCT coefficient. The inverse transform/inverse quantization module 130 inversely transforms the inversely quantized DCT coefficient. The inverse transform/inverse quantization module 130 generates a restored differential wavefront block by inversely quantizing and inversely transforming the quantized differential wavefront block (S540).

The phase wavefront restoring module 140 restores the phase wavefront block by combining the restored differential wavefront block and the first prediction wavefront block 310 or combining the restored differential wavefront block and the second prediction wavefront block, and generates a restored phase wavefront block (S550).

The in-loop filter module 150 restores the phase wavefront by using a plurality of restored phase wavefront blocks and generates a restored phase wavefront (S560).

The wavefront restoring module 170 restores the phase-only hologram from the restored phase wavefront by using a phase wrapping technique (S570). One frame of a phase-only hologram is restored from one restored phase wavefront. The wavefront restoring module 170 may generate a phase-only hologram video by combining a plurality of phase-only hologram frames.

Figure 6:
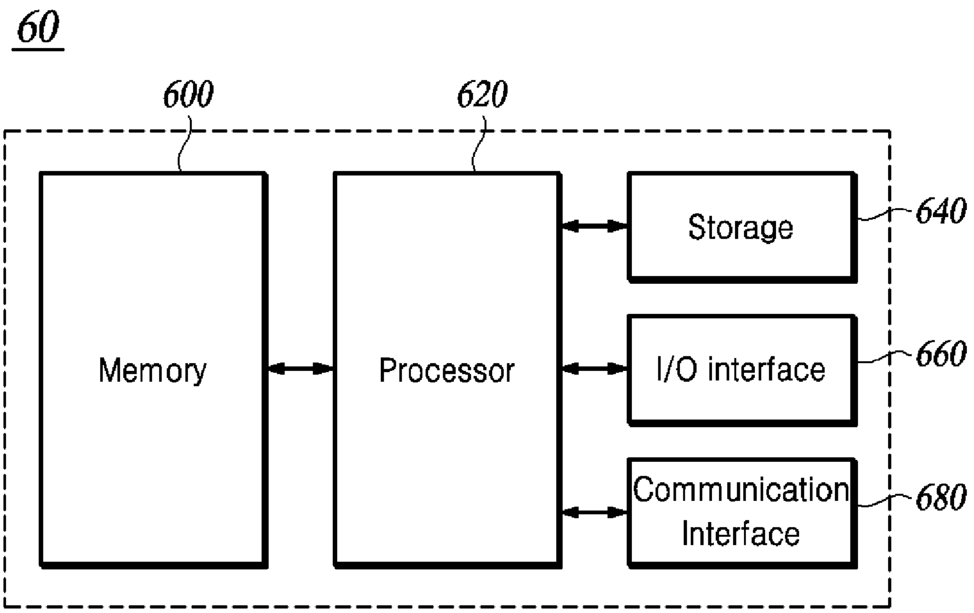
FIG. 6 is a block diagram schematically illustrating an example computing device that can be used to implement the method or device according to embodiments of the present disclosure.

FIG. 6 is a block diagram schematically illustrating an example computing device that can be used to implement the methods or devices according to embodiments of the present disclosure.

A computing device 60 may include some or all of a memory 600, a processor 620, a storage 640, an input and output (I/O) interface 660, and a communication interface 680. The computing device 60 may structurally and/or functionally include at least a portion of the phase wavefront generating module 100, the intra-prediction module 110, the transform/quantization module 120, the inverse transform/inverse quantization module 130, the phase wavefront restoring module 140, the in-loop filter module 150, the frame buffer 160, the wavefront restoring module 170, the inter-prediction module 180 or the entropy encoder 400. The computing device 60 may be a stationary computing device such as a desktop computer, a server, or an AI accelerator, or a mobile computing device such as a laptop computer or a smart phone.

The memory 600 may store a program that allows the processor 620 to perform methods or operations according to various embodiments of the present disclosure. For example, the program may include a plurality of instructions that are executable by the processor 620. The method illustrated in FIG. 5 may thus be performed by the plurality of instructions being executed by the processor 620.

The memory 600 may be a single memory or a plurality of memories. In this case, information required to perform methods or operations according to various embodiments of the present disclosure may be stored in the single memory or divided and stored in the plurality of memories. When the memory 600 is configured of the plurality of memories, the plurality of memories may be physically separated.

The memory 600 may include at least one of a volatile memory and a non-volatile memory. The volatile memory includes a static random access memory (SRAM), a dynamic random access memory (DRAM), or the like, and the non-volatile memory includes a flash memory.

The processor 620 may include at least one core capable of executing at least one instruction. The processor 620 may execute instructions stored in the memory 600. The processor 620 may be a single processor or a plurality of processors.

The storage 640 maintains stored data even when power supplied to the computing device 60 is cut off. For example, the storage 640 may include a non-volatile memory or may include a storage medium such as a magnetic tape, optical disc, or magnetic disk.

A program stored in the storage 640 may be loaded into the memory 600 before being executed by the processor 620. The storage 640 may store files created in a program language, and a program created from a file by a compiler or the like may be loaded into the memory 600. The storage 640 may store data to be processed by the processor 620 and/or data processed by the processor 620.

The I/O interface 660 may provide an interface with an input device such as a keyboard or mouse, and/or an output device such as a display device or printer. An user can trigger execution of a program in the processor 620 through the input device and/or check a processing result of the processor 620 through the output device.

The communication interface 680 may provide access to an external network. For example, the computing device 60 may communicate with another device (for example, the phase wavefront generating module 100, the intra-prediction module 110, the transform/quantization module 120, the inverse transform/inverse quantization module 130, the phase wavefront restoring module 140, the in-loop filter module 150, the frame buffer 160, the wavefront restoring module 170, the inter-prediction module 180 or the entropy encoder 400) via the communication interface 680.

The components described in the example embodiments of the present disclosure may be achieved by hardware components including at least one of a digital signal processor (DSP), a processor, a controller, an application specific integrated circuit (ASIC), a programmable logic element such as a field programmable gate array (FPGA), other electronic devices, and combinations thereof. At least some of the functions or the processes described in the example embodiments of the present disclosure may be achieved by software, and the software may be recorded on a recording medium. At least some of the components, the functions, and the processes described in the example embodiments of the present disclosure may be achieved by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented in digital electronic circuitry, or in computer hardware, firmware, software, or in combinations of them. The techniques may be implemented as a computer program product, i.e., a computer program tangibly embodied in an information carrier, e.g., in a machine-readable storage device (for example, a computer-readable medium) or in a propagated signal for processing by, or to control the operation of, a data processing apparatus, e.g., a programmable processor, a computer, or multiple computers. A computer program such as the above computer program(s) may be written in any form of programming language, including compiled or interpreted languages, and may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM) and a digital video disk (DVD), magneto-optical media such as a floptical disk, a read only memory (ROM), a random access memory (RAM), a flash memory, an erasable programmable ROM (EPROM), and an electrically erasable programmable ROM (EEPROM). A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Accordingly, one of ordinary skill would understand that the scope of the claimed invention is not to be limited by the above explicitly described embodiments but by the claims and equivalents thereof.

DETAILED DESCRIPTION OF MAIN ELEMENTS

100: Phase wavefront generating module
110: Intra-prediction module
120: Transform/quantization module
130: Inverse transform/inverse quantization module
140: Phase wavefront restoring module
150: In-loop filter module
160: Frame buffer
170: Wavefront restoring module
180: Inter-prediction module

What is claimed is:

1. An apparatus for compressing a hologram, the apparatus comprising:

a memory configured to store one or more instructions; and one or more processors configured to execute the one or more instructions stored in the memory, wherein the one or more processors, by executing the one or more instructions, perform steps comprising:

generating a plurality of phase wavefront blocks by using a certain frame of a phase-only hologram;

generating a Zernike coefficient block from a phase wavefront block among the plurality of phase wavefront blocks;

generating a first prediction wavefront block by using the phase wavefront block and the Zernike coefficient block;

generating a differential wavefront block by using the phase wavefront block and the first prediction wavefront block;

transforming and quantizing the differential wavefront block;

generating a restored differential wavefront block by inversely quantizing and inversely transforming the differential wavefront block which is transformed and quantized;

generating a restored phase wavefront block by using the restored differential wavefront block;

generating a restored phase wavefront by using a plurality of restored phase wavefront blocks which are generated by using the restored differential wavefront blocks; and restoring the phase-only hologram by using the restored phase wavefront.

2. The apparatus of claim 1, wherein the one or more processors further perform a step of:

generating a motion vector and a second prediction wavefront block by predicting a motion of a phase wavefront block from a plurality of restored phase wavefronts which are generated by using the restored differential wavefront block.

3. The apparatus of claim 2, wherein the generating the differential wavefront block includes:

generating the differential wavefront block by using the difference between the phase wavefront block and one selected from between the first prediction wavefront block and the second prediction wavefront block.

4. The apparatus of claim 2, wherein the generating a restored phase wavefront block includes:

generating the restored phase wavefront block by combining the restored differential wavefront block with one selected from between the first prediction wavefront block and the second prediction wavefront block.

5. The apparatus of claim 2, wherein the one or more processors further perform a step of:

losslessly compressing the differential wavefront block which is transformed and quantized, the Zernike coefficient block, and the motion vector.

6. The apparatus of claim 1, wherein the transforming and quantizing the differential wavefront block includes:

transforming the differential wavefront block by using the discrete cosine transform (DCT).

7. The apparatus of claim 1, wherein the generating the plurality of phase wavefront blocks includes:

generating the plurality of phase wavefront blocks from the phase-only hologram by using a phase unwrapping technique.

8. The apparatus of claim 1, wherein the generating the restored phase wavefront includes:

generating the restored phase wavefront by combining the plurality of restored phase wavefront blocks and removing fringes therebetween.

9. The apparatus of claim 1, wherein the restoring the phase-only hologram includes:

restoring the phase-only hologram by using a phase wrapping technique in which the phase period is 2.

10. A method for compressing and restoring a hologram, the method comprising:

generating a plurality of phase wavefront blocks by using a certain frame of a phase-only hologram;

generating a Zernike coefficient block from a phase wavefront block among the plurality of phase wavefront blocks;

generating a first prediction wavefront block by using the phase wavefront block and the Zernike coefficient block;

generating a differential wavefront block by using the phase wavefront block and the first prediction wavefront block;

transforming and quantizing the differential wavefront block;

generating a restored differential wavefront block by inversely quantizing and inversely transforming the differential wavefront block which is transformed and quantized;

generating a restored phase wavefront block by using the restored differential wavefront block;

generating a restored phase wavefront by combining a plurality of restored phase wavefront blocks which are generated by using the restored differential wavefront blocks; and restoring the phase-only hologram from the restored phase wavefront.

11. The method of claim 10, further comprising:

generating a motion vector and a second prediction wavefront block by predicting a motion of a phase wavefront block from a plurality of restored phase wavefronts which are generated by using the restored differential wavefront block.

12. The method of claim 11, wherein the generating the differential wavefront block includes:

generating the differential wavefront block by using the difference between the phase wavefront block and one selected from between the first prediction wavefront block and the second prediction wavefront block.

13. The method of claim 11, wherein the generating the restored phase wavefront block includes:

generating the restored phase wavefront block by combining the restored differential wavefront block with one selected from between the first prediction wavefront block and the second prediction wavefront block.

14. The method of claim 11, further comprising:

losslessly compressing the differential wavefront block which is transformed and quantized, the Zernike coefficient block, and the motion vector.

15. The method of claim 10, wherein the transforming and quantizing the differential wavefront block includes:

transforming the differential wavefront block by using the discrete cosine transform (DCT).

16. The method of claim 10, wherein the generating the restored phase wavefront includes:

generating the restored phase wavefront by combining the plurality of restored phase wavefront blocks and removing fringes therebetween.

17. The method of claim 10, wherein the generating the plurality of phase wavefront blocks includes:

transforming the phase-only program into the plurality of phase wavefront blocks by using a phase wrapping technique.

18. The method of claim 10, wherein the restoring the phase-only hologram includes:

restoring the phase-only hologram by using a phase wrapping technique in which the phase period is $2\pi$.

* * * * *